(12) United States Patent
Nagatsuka

(10) Patent No.: US 9,350,230 B2
(45) Date of Patent: May 24, 2016

(54) POWER CONVERSION DEVICE AND POWER CONVERSION METHOD WITH ADJUSTABLE BAND-PASS FILTER

(71) Applicant: Yoshio Nagatsuka, Tokyo (JP)

(72) Inventor: Yoshio Nagatsuka, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 14/435,662

(22) PCT Filed: Dec. 28, 2012

(86) PCT No.: PCT/JP2012/084187
§ 371 (c)(1),
(2) Date: Apr. 14, 2015

(87) PCT Pub. No.: WO2014/103055
PCT Pub. Date: Jul. 3, 2014

(65) Prior Publication Data
US 2015/0263604 A1    Sep. 17, 2015

(51) Int. Cl.
*H02M 1/42* (2007.01)
*H02M 7/04* (2006.01)
*B60L 9/28* (2006.01)

(52) U.S. Cl.
CPC ............... *H02M 1/4208* (2013.01); *B60L 9/28* (2013.01); *H02M 7/04* (2013.01); *B60L 2200/26* (2013.01); *B60L 2210/30* (2013.01); *B60L 2210/40* (2013.01); *Y02T 10/7241* (2013.01)

(58) Field of Classification Search
CPC ............................. H02M 7/04; H02M 1/4208
See application file for complete search history.

(56) References Cited

U.S. PATENT DOCUMENTS 8,410,713 B2 * 4/2013 Kumar ............... H05B 41/2855
315/200 R

FOREIGN PATENT DOCUMENTS

| JP | 63-056101 A | 3/1988 |
| JP | 01-259702 A | 10/1989 |
| JP | 02-155402 A | 6/1990 |

(Continued)

OTHER PUBLICATIONS

International Search Report (PCT/ISA/210) mailed on Mar. 12, 2013, by the Japanese Patent Office as the International Searching Authority for International Application No. PCT/JP2012/084187.

(Continued)

*Primary Examiner* — Emily P Pham
(74) *Attorney, Agent, or Firm* — Buchanan Ingersoll & Rooney PC

(57) ABSTRACT

A transformer steps down an input AC power, and supplies the AC power to a converter. The primary voltage of the transformer detected by a voltage detector is supplied to a converter controller and a frequency detector via a BPF. The converter controller controls the converter such that a power factor is equal to or greater than a predetermined value based on the primary voltage, and the converter converts the AC power into DC power. The frequency detector detects the frequency of the primary voltage based on an interval between time points at which the primary voltage via the BPF exceeds a threshold. A filter adjuster calculates a filter characteristic with the detected frequency as a center frequency of the BPF, and adjusts the BPF based on the filter characteristic.

4 Claims, 5 Drawing Sheets

(56) References Cited

FOREIGN PATENT DOCUMENTS

| | | |
|---|---|---|
| JP | 04-045613 A | 2/1992 |
| JP | 06-189411 A | 7/1994 |
| JP | 06-276613 A | 9/1994 |
| JP | 08-126343 A | 5/1996 |
| JP | 2001-037252 A | 2/2001 |
| JP | 2013-042592 A | 2/2013 |

OTHER PUBLICATIONS

Written Opinion (PCT/ISA/237) mailed on Mar. 12, 2013, by the Japanese Patent Office as the International Searching Authority for International Application No. PCT/JP2012/084187.

Extended European Search Report dated Mar. 17, 2016 issued in corresponding European Patent Appln. No. 12890869.6 (7 pages).

* cited by examiner

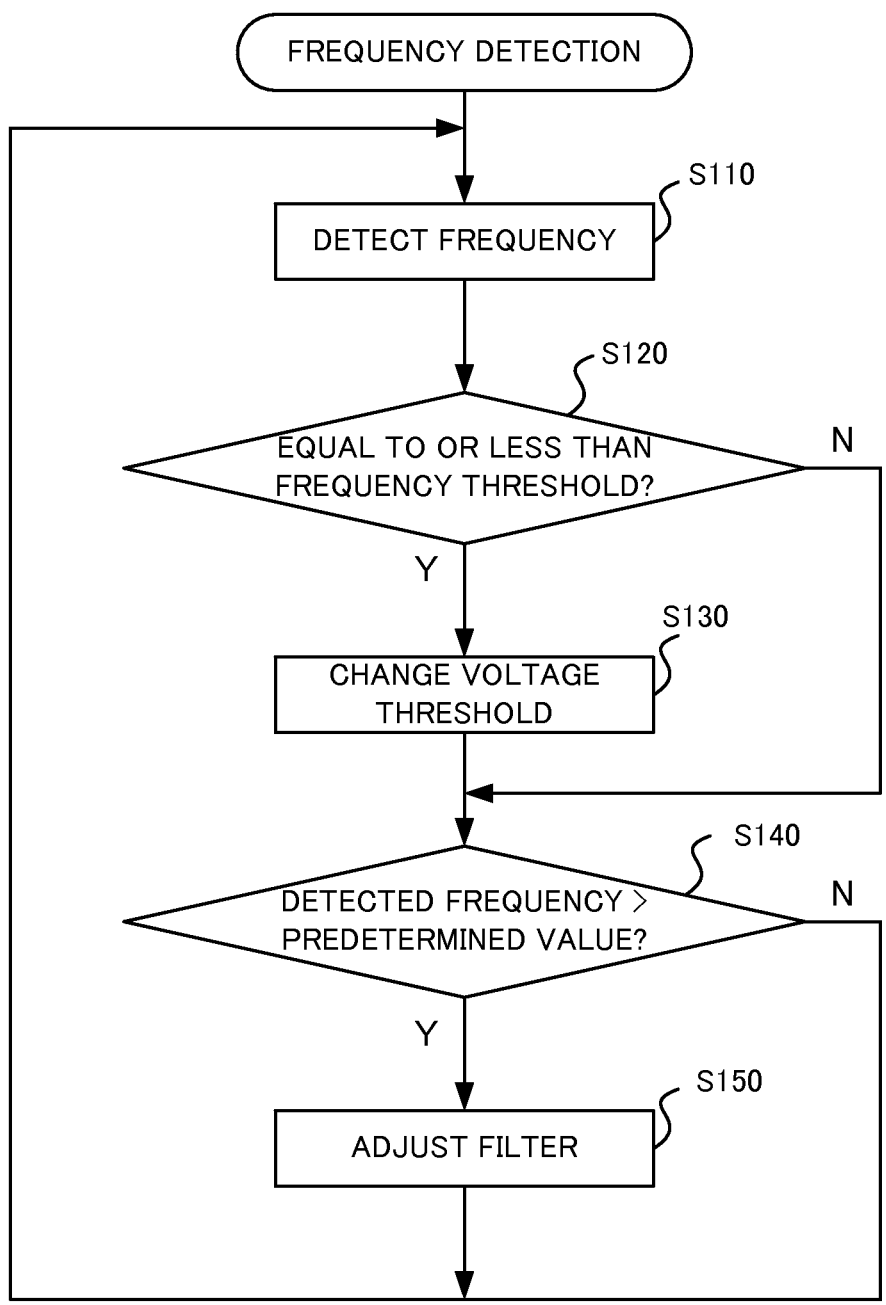

POWER CONVERSION DEVICE AND POWER CONVERSION METHOD WITH ADJUSTABLE BAND-PASS FILTER

TECHNICAL FIELD

The present disclosure relates to a power conversion device and a power conversion method.

BACKGROUND ART

Alternating current (AC) type electric railroad vehicles (hereinafter, referred to as electric vehicles) obtain AC power from AC overhead wiring through a power collector such as a pantograph, and steps down the AC power with a main transformer, thereby obtaining an AC power source for an AC power conversion device. The AC power conversion device includes a converter that converts AC power into direct current (DC) power, an inverter that converts the DC power into AC power to drive a main electric motor, and a DC intermediate capacitor that connects the converter with the inverter. For the control of the converter, a pulse width modulation (PWM) scheme is applied, and a highly efficient power-factor-of-one control that makes the power factor of an input power to the converter to be as close to 1 as possible is performed.

In order to realize the highly efficient power-factor-of-one control, a microcomputer controller in the converter detects overhead wire voltage from a primary circuit of the main transformer, and performs a control in such a way that the input voltage of the converter and the overhead wire voltage have the same phase. In order to precisely detect the phase of the overhead wire voltage, it is necessary to detect the frequency of the overhead wire voltage.

At the time of a blackout, a PWM converter operates as a regenerative inverter, that is, as a power generator, and operates in synchronization with the output frequency thereof. Such operation causes the deviation of the output frequency from a frequency range of the overhead wire voltage, and conventionally the deviation is detected. In order to enable a changing in threshold for detecting the deviation of the output frequency for each territory where the frequency of the overhead wire voltage differs, it is necessary to detect the frequency of the overhead wire voltage.

Hence, Patent Literature 1 discloses a frequency detector for a train that is provided with the same number of band-pass filters (BPFs) as the types of overhead wire power source frequencies. This frequency detector has the center frequencies of the BPFs set to be consistent with respective frequencies of the power sources, and detects the center frequency of the BPF with the largest output as the overhead wire frequency.

CITATION LIST

Patent Literature

Patent Literature 1: Unexamined Japanese Patent Application Kokai Publication No. S63-56101

SUMMARY OF INVENTION

Technical Problem

According to the frequency detector for a train disclosed in Patent Literature 1, it is necessary to provide the same number of BPFs and envelope processing circuits as the types of already-known overhead wire frequencies, and thus a circuit of the frequency detector for a train is complex. In addition, the frequency is 50 Hz or 60 Hz in Japan, but a overhead wire frequency of 16.7 Hz or 25 Hz is adopted in other countries. According to the frequency detector for a train disclosed in Patent Literature 1, it is necessary to provide BPFs in accordance with the types of frequencies in territories where a train runs, set the filter characteristics of the respective BPFs, and also configure the respective envelope processing circuits. Therefore, it is difficult to standardize a circuit configuration. In addition, when there is an inconsistency between the overhead wire frequency and the preset center frequency of the BPF, the converter operation becomes unstable.

The present disclosure has been made in view of the aforementioned circumstances, and it is an objective of the present disclosure to enable detection of the frequency of an input voltage via an even simpler circuit configuration, and to enable more stable converter operation.

Solution to Problem

To accomplish the above objective, a power conversion device of the present disclosure includes a transformer, a frequency detector, a filter adjuster, and a conversion unit. The transformer transforms an input AC voltage. The frequency detector detects, for each threshold in a plurality of thresholds in order from greatest to least, a frequency of the AC voltage based on an interval between time points at which the AC voltage via through a band-pass filter exceeds the threshold. The filter adjuster calculates, when the frequency of the AC voltage detected by the frequency detector is greater than a predetermined value, a filter characteristic with the detected frequency of the AC voltage as a center frequency of the band-pass filter, and adjusts the band-pass filter based on the filter characteristic. The conversion unit performs a control based on the AC voltage via the band-pass filter such that a power factor is equal to or greater than a predetermined value. The conversion unit then converts the AC voltage transformed by the transformer into a DC voltage, and outputs the DC voltage.

Advantageous Effects of Invention

According to the present disclosure, it becomes possible to detect the frequency of an input voltage via a simpler circuit configuration, and to further stabilize a converter operation.

BRIEF DESCRIPTION OF DRAWINGS

FIG. 7 is a flowchart illustrating an example of a frequency detection operation that is performed by the power conversion device according to the embodiment.

DESCRIPTION OF EMBODIMENTS

Figure 1:
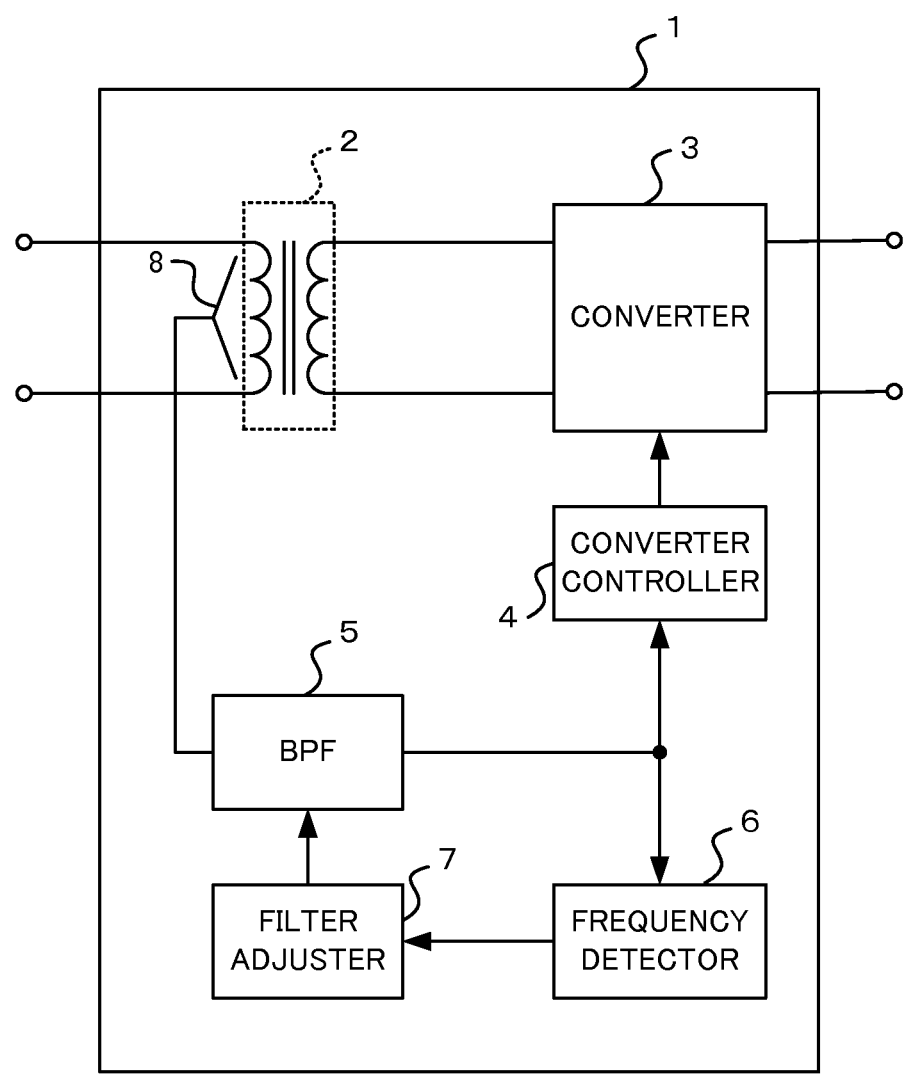
FIG. 1 is a block diagram illustrating an example of configuration of a power conversion device according to an embodiment of the present disclosure.

An embodiment of the present disclosure is explained below in detail with reference to the drawings. Note that in the drawings, the same signs are given to the same or similar parts.

FIG. 1 is a block diagram illustrating an example of configuration of a power conversion device according to an embodiment of the present disclosure. A power conversion device 1 includes a transformer 2, a converter 3, a converter controller 4, a BPF 5, a frequency detector 6, a filter adjuster 7, and a voltage detector 8. The converter controller 4 includes a processor that has a central processing unit (CPU), an internal memory and the like, and a memory including a random access memory (RAM), a flash memory, and the like. The converter controller 4 executes a control program stored in the memory, and controls the converter 3. The converter controller 4 and the converter 3 work together to operate as a conversion unit.

Figure 2:
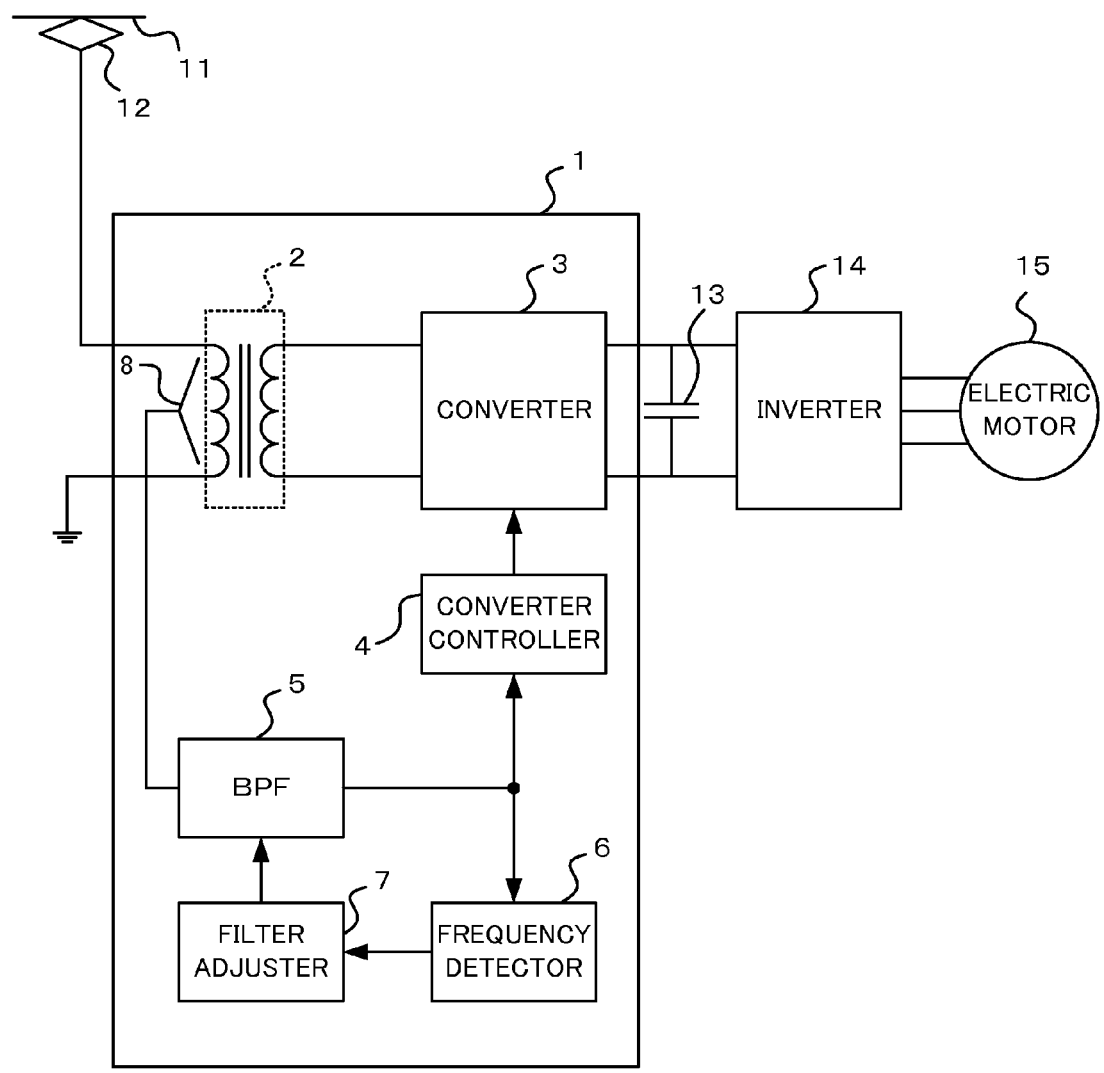
FIG. 2 is a block diagram illustrating an example of placement of the power conversion device to an electric vehicle according to the embodiment.

FIG. 2 is a block diagram illustrating an example of placement of the power conversion device to an electric vehicle according to the embodiment. AC power is supplied to the primary side of the transformer 2 from an overhead wire 11 through a power collector 12. The transformer 2 steps down the AC power supplied to the primary side, and supplies the stepped-down AC power to the converter 3. The converter 3 converts this AC power into DC power, and outputs the DC power to an inverter 14 through an intermediate circuit that includes a filter capacitor 13. The inverter 14 converts the DC power into AC power, supplies the AC power to an electric motor 15, thereby driving the electric motor 15. When the electric motor 15 is actuated, propulsive force of the electric vehicle is generated.

The voltage at the primary side of the transformer 2 (hereinafter, referred to as a "overhead wire voltage") is detected by the voltage detector 8, and is supplied to both the converter controller 4 and the frequency detector 6 through the BPF 5. The converter controller 4 generates gate pulses based on the overhead wire voltage via the BPF 5, and controls a switching element in the converter 3. The converter controller 4 performs a control in such a way that the power factor of the input voltage of the converter 3 becomes equal to or greater than a predetermined value, for example, the power factor becomes as close to 1 as possible.

The frequency detector 6 detects a frequency of the overhead wire voltage based on an interval between time points at which the overhead wire voltage via the BPF 5 exceeds a threshold, and sends the detected frequency to the filter adjuster 7. The details of the operation of the frequency detector 6 is discussed later. When the frequency sent from the frequency detector 6 is greater than the predetermined value, and it can be deemed that the frequency detector 6 has detected the frequency of the overhead wire voltage, the filter adjuster 7 calculates a filter characteristic with this frequency of the overhead wire voltage as a center frequency of the BPF 5, and adjusts the BPF 5 based on the filter characteristic. When the frequency sent from the frequency detector 6 is greater than, for example, zero, the filter adjuster 7 calculates the filter characteristic with this frequency as the center frequency of the BPF 5, and adjusts the BPF 5 based on the filter characteristic. The converter 3 is controlled by the converter controller 4 based on the overhead wire voltage via the BPF 5.

Adjusting the filter characteristic of the BPF 5 as it is needed, enables the converter 3 to operate in a more stable manner.

Figure 3:
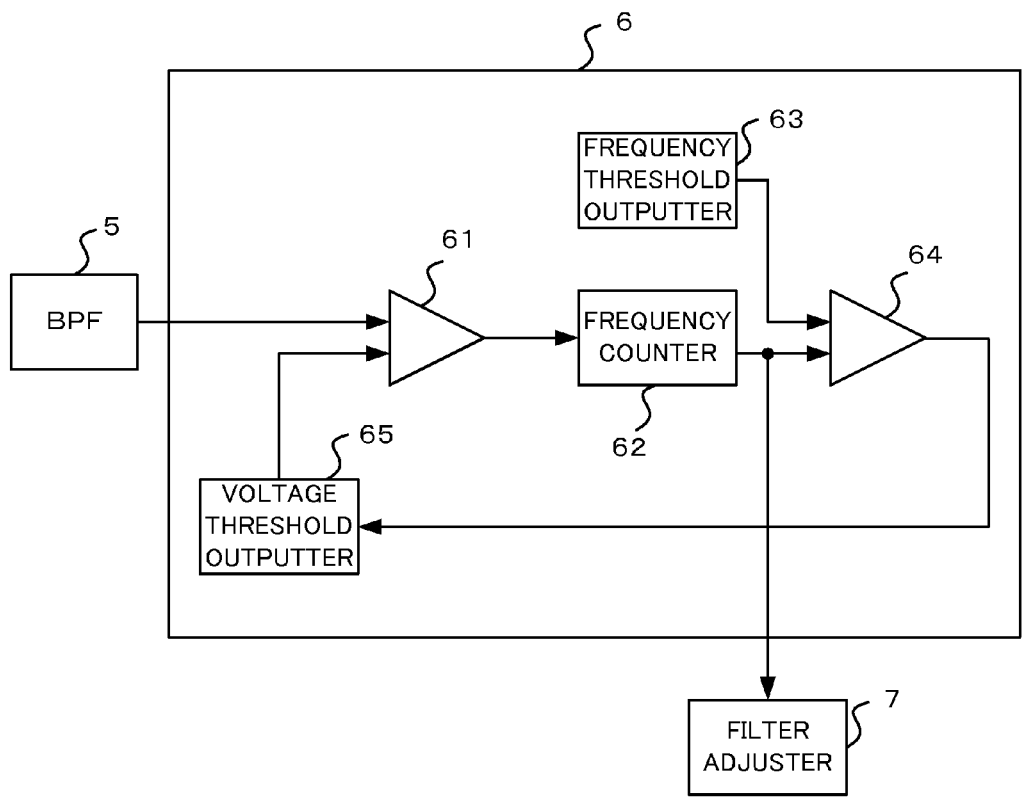
FIG. 3 is a block diagram illustrating an example of configuration of a frequency detector according to the embodiment.

FIG. 3 is a block diagram illustrating an example of configuration of the frequency detector according to the embodiment. The frequency detector 6 includes a comparator 61, a frequency counter 62, a frequency threshold outputter 63, a comparator 64, and a voltage threshold outputter 65. Input into the comparator 61 are the overhead wire voltage via the BPF 5 and a voltage threshold output by the voltage threshold outputter 65. The comparator 61 outputs a signal at high-level (H-level) when the overhead wire voltage via the BPF 5 is greater than the voltage threshold, and outputs a signal at low-level (L-level) when the primary voltage of the transformer 2 through the BPF 5 is equal to or less than the voltage threshold.

At the rising in the output from the comparator 61, the frequency counter 62 starts counting at a predetermined cycle, and outputs, to the comparator 64 and the filter adjuster 7, the frequency of the overhead wire voltage that is an inverse number of a product of the cycle and the counted number up to the next rising in the output from the comparator 61. At the next rising in the output from the comparator 61, the frequency counter 62 resets the counted number again and newly-starts over the counting up at the predetermined cycle. When the predetermined cycle is shortened, it becomes possible for the frequency counter 62 to improve the detection precision of the frequency of the overhead wire voltage.

Input into the comparator 64 are the output from the frequency counter 62 and a frequency threshold output from the frequency threshold outputter 63. When the output from the frequency counter 62 is greater than the frequency threshold, the comparator 64 outputs a signal at H-level, and when the output from the frequency counter 62 is equal to or less than the frequency threshold, the comparator 64 outputs a signal at L-level.

Figure 4:
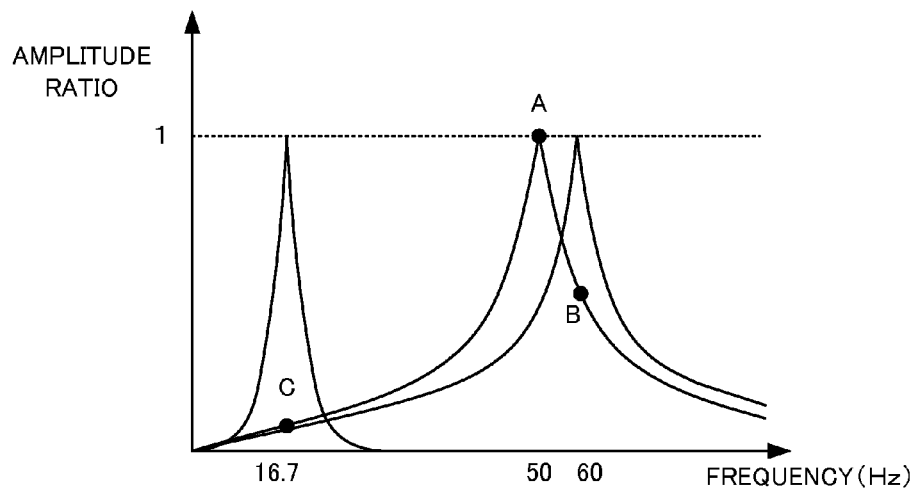
FIG. 4 is a diagram illustrating an example of output from a BPF according to the embodiment.

FIG. 4 is a diagram illustrating an example output from the BPF according to the embodiment. The horizontal axis represents a frequency (Hz). The vertical axis represents an amplitude ratio of the overhead wire voltage via the BPF 5 to the overhead wire voltage. The graph illustrates the characteristics when the center frequency of the BPF 5 is respectively 16.7 Hz, 50 Hz, and 60 Hz. An example case in which the center frequency of the BPF 5 is 50 Hz is explained. The amplitude ratio is indicated by a point A in the case when the frequency of the overhead wire voltage is 50 Hz, point B when that frequency is 60 Hz, and point C when that frequency is 16.7 Hz. When the frequency of the overhead wire voltage is 16.7 Hz and the center frequency of the BPF 5 is 50 Hz, the attenuation amount is large and the voltage value through the BPF 5 becomes small.

When the attenuation by the BPF 5 is large and the overhead wire voltage via the BPF 5 is equal to or less than the voltage threshold output by the voltage threshold outputter 65, it is difficult for the frequency counter 62 to detect the frequency of the overhead wire voltage. In order to enable a detection of the frequency of the overhead wire voltage even if the possible value of the frequency of the overhead wire voltage is unknown or the frequency of the overhead wire voltage fluctuates, the voltage threshold outputter 65 stores multiple voltage thresholds. The voltage threshold outputter 65 outputs the thresholds in order from greatest to least.

The frequency counter 62 detects the frequency based on the output from the comparator 61 that is determined by the voltage threshold and the overhead wire voltage via the BPF 5. When the overhead wire voltage via the BPF 5 is equal to or less than the voltage threshold output by the voltage threshold outputter 65, the output from the frequency counter 62 is zero, and the output from the comparator 64 is at L-level. When the output from the comparator 64 maintains L-level for equal to or longer than a certain time period, the overhead wire voltage is equal to or less than the voltage threshold and the frequency is undetectable. Hence, the voltage threshold outputter 65 changes the threshold to a smaller value. By repeating the above-explained processes, even if the possible value of the frequency of the overhead wire voltage is unknown or the frequency of the overhead wire voltage fluctuates, it becomes possible to detect the frequency of the overhead wire voltage. An operation of the frequency detector 6 when the multiple voltage thresholds are applied is explained below.

Figure 5:
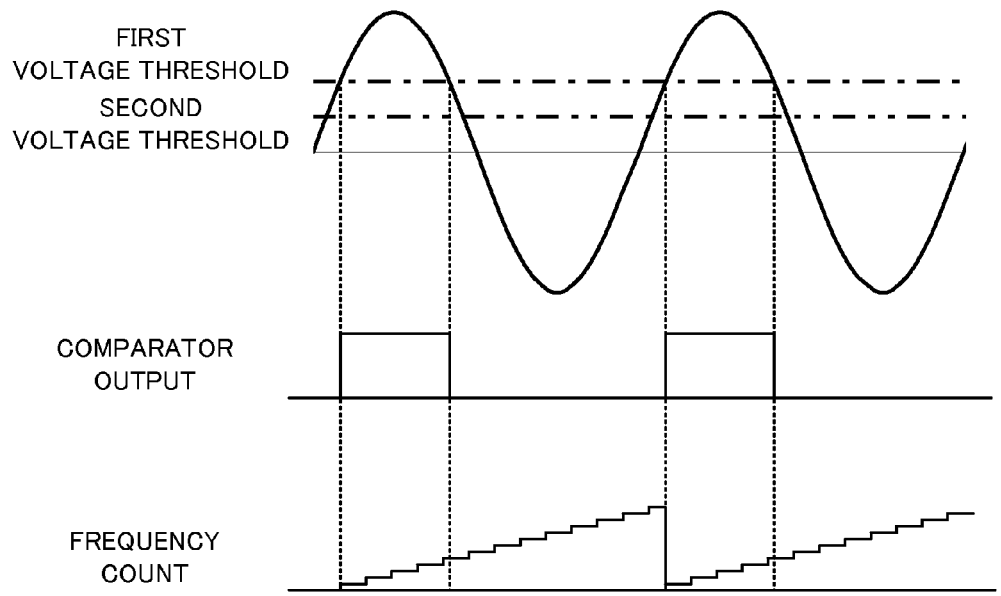
FIG. 5 is a diagram illustrating an example of a frequency detection that is performed by the frequency detector according to the embodiment.
Figure 6:
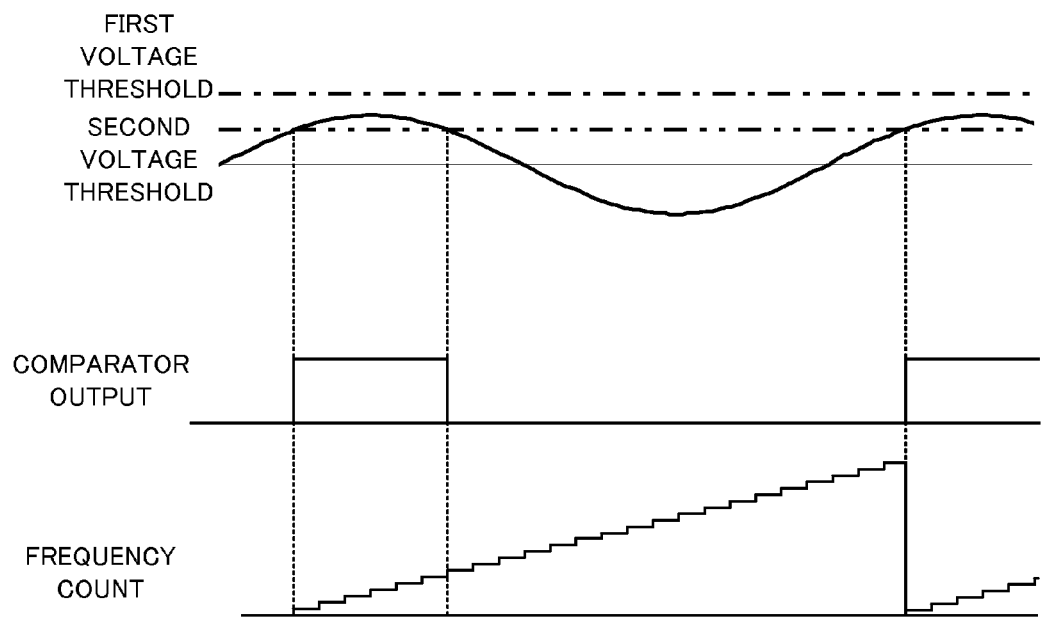
FIG. 6 is a diagram illustrating an example of a frequency detection that is performed by the frequency detector according to the embodiment.

FIGS. 5 and 6 are diagrams illustrating examples of frequency detections that are performed by the frequency detector according to the embodiment. The upper part of FIG. 5 is a graph of the overhead wire voltage via the BPF 5 when the center frequency of the BPF 5 is 50 Hz and the frequency of the overhead wire voltage is 50 Hz. As illustrated in FIG. 4, when both the center frequency of the BPF 5 and the frequency of the overhead wire voltage are 50 Hz, the attenuation is quite small, and thus the overhead wire voltage via the BPF 5 exceeds a first voltage threshold indicated by a single-dot dashed line. As illustrated in the middle part of FIG. 5, the comparator 61 outputs signals that transit to the H-level from the L-level when the overhead wire voltage via the BPF 5 exceeds the first voltage threshold, and that transit to L-level from the H-level when the overhead wire voltage via the BPF 5 becomes equal to or less than the first voltage threshold.

As illustrated in the lower part of FIG. 5, at the rising in the output from the comparator 61, the frequency counter 62 starts counting at a predetermined cycle and, calculates the frequency of the overhead wire voltage that is 50 Hz based on an inverse number of a product of the cycle and the counted number up to the next rising in the output from the comparator 61, and outputs the calculated frequency to the comparator 64 and the filter adjuster 7. At the next rising in the output from the comparator 61, the frequency counter 62 resets the counted number again and newly-starts over the counting up at the predetermined cycle. When, for example, the frequency threshold is 10 Hz, the output from the comparator 64 is at H-level. Since the output from the comparator 64 is at H-level, the voltage threshold outputter 65 does not change the voltage threshold. The filter adjuster 7 calculates the filter characteristics with the center frequency of the BPF 5 as being 50 Hz, and adjusts the BPF 5 based on the calculated filter characteristics.

Conversely, the upper part of FIG. 6 is a graph of the overhead wire voltage via the BPF 5 when the center frequency of the BPF 5 is 50 Hz and the frequency of the overhead wire voltage is 16.7 Hz. As illustrated in FIG. 4, when the center frequency of the BPF 5 is 50 Hz and the frequency of the overhead wire voltage is 16.7 Hz, the attenuation amount is large, and thus the overhead wire voltage via the BPF 5 becomes less than the first voltage threshold. In this case, when the voltage threshold outputter 65 keeps outputting the first voltage threshold, the output from the comparator 61 maintains L-level. Hence, the frequency counter 62 is unable to detect the frequency of the overhead wire voltage, and thus the output from the frequency counter 62 is zero. When, for example, the frequency threshold is 10 Hz, the output from the comparator 64 is still at L-level.

When a condition in which the output from the comparator 64 is at L-level continues for equal to or longer than a certain time period, the voltage threshold outputter 65 changes the threshold to a smaller value. When, for example, a condition in which the output from the comparator 64 is at L-level continues for equal to or longer than the certain time period, the voltage threshold outputter 65 outputs a second voltage threshold indicated by a double-dot dashed line instead of the first voltage threshold.

The overhead wire voltage via the BPF 5 then exceeds the second voltage threshold. As illustrated in the middle part of FIG. 6, the comparator 61 outputs signals that transit to the H-level from the L-level when the overhead wire voltage via the BPF 5 exceeds the second voltage threshold, and that transit to the L-level from the H-level when the overhead wire voltage via the BPF 5 becomes equal to or less than the second voltage threshold. As illustrated in the lower part of FIG. 6, at the rising in the output from the comparator 61, the frequency counter 62 starts counting at the predetermined cycle and calculates the frequency of the overhead wire voltage that is 16.7 Hz based on an inverse number of a product of the cycle and the counted number up to the next rising in the output by the comparator 61, and outputs the calculated frequency to the comparator 64 and the filter adjuster 7. At the next rising in the output from the comparator 61, the frequency counter 62 resets the counted number again and newly-starts over the counting up at the predetermined cycle. The filter adjuster 7 calculates the filter characteristic with the center frequency of the BPF 5 as being 16.7 Hz, and adjusts the BPF 5 based on the calculated filter characteristics.

When the voltage threshold outputter 65 is provided with multiple thresholds, even if an electric vehicle runs through territories where the frequency of the overhead wire voltage differs or the frequency of the overhead wire voltage fluctuates, the frequency of the overhead wire voltage is precisely detected. In addition, when the smallest threshold in the thresholds of the voltage threshold outputter 65 is set to a value near zero, even if the overhead wire voltage via the BPF 5 is an infinitesimal value, the frequency is still detectable.

Still further, setting the voltage threshold to a large value suppresses an adverse effect of noises, and thus the frequency of the overhead wire voltage is detected more precisely. That is, when the voltage threshold values are applied in order from greatest to least as explained above, the detection precision of the frequency of the overhead wire voltage is improved.

FIG. 7 is a flowchart illustrating an example of a frequency detection operation that is performed by the power conversion device according to the embodiment. At the rising in the output from the comparator 61, the frequency counter 62 starts counting at a predetermined cycle and detects the frequency of the overhead wire voltage based on an inverse number of a product of the cycle and the counted number up to the next rising in the output from the comparator 61. At the next rising in the output from the comparator 61, the frequency counter 62 resets the counted number again and newly-starts over the counting up at the predetermined cycle (step S110).

When the detected frequency of the overhead wire voltage is equal to or less than the frequency threshold, and a condition in which the output from the comparator 64 is at L-level continues for equal to or longer than a certain time period (step S120; Y), the voltage threshold outputter 65 changes the threshold to a smaller value (step S130). When the detected frequency of the overhead wire voltage exceeds the frequency threshold, and the output from the comparator 64 is at H-level (step S120; N), the process jumps to step S140 without executing step S130. Next, the filter adjuster 7 calculates the filter characteristic with this frequency of the overhead wire voltage as the center frequency of the BPF 5 when the frequency detected by the frequency counter 62 is greater than a predetermined value and it can be deemed that the frequency detector 6 has detected the frequency of the overhead wire voltage (step S140; Y), and adjusts the BPF 5 based on the calculated filter characteristics (step S150). When the frequency detected by the frequency counter 62 is equal to or less than the predetermined value (step S140; N), the process in step S150 is not executed. The power conversion device 1 repeats the above-explained frequency detection process at a predetermined cycle. In addition, the timing in which the power conversion device 1 performs power conversion, converting the input AC power into DC power, is independent from that of the above-explained frequency detection process.

According to the power conversion device 1, there is only one BPF 5, and it is unnecessary to prepare multiple BPFs in accordance with the types of possible frequencies of the overhead wire voltage. In general, a BPF circuit contains a field-programmable gate array (FPGA). Hence, by adopting a structure with one BPF, the capacity of the FPGA can be reduced and thus, the circuit board can be down-sized.

In addition, the filter characteristics of the BPF 5 are adjusted in accordance with the detected frequency. Hence, the center frequency of the BPF 5 is changed in accordance with a fluctuation in the frequency of the overhead wire voltage, thereby enabling more stable operation of the converter 3.

Still further, the voltage threshold outputter 65 may be constructed to have a voltage threshold that is quite a small value. When the voltage threshold is set to an infinitesimal value, even if the frequency of the overhead wire voltage fluctuates, the overhead wire voltage via the BPF 5 can exceed the voltage threshold. Moreover, when the number of voltage thresholds is one, the frequency threshold outputter 63 and the comparator 64 become unnecessary, and thus the circuit configuration can be simplified further.

As explained above, according to the power conversion device 1 of this embodiment, the frequency of an input voltage can be detected via a simpler circuit configuration, thereby enabling more stable operation of the converter.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitably applicable to a power conversion device that converts AC power into DC power.

REFERENCE SIGNS LIST

1 Power conversion device
2 Transformer
3 Converter
4 Converter controller
5 BPF
6 Frequency detector
7 Filter adjuster
8 Voltage detector
11 Overhead wire
12 Power collector
13 Filter capacitor
14 Inverter
15 Electric motor
61 Comparator
62 Frequency counter
63 Frequency threshold outputter
64 Comparator
65 Voltage threshold outputter

The invention claimed is:

1. A power conversion device comprising:
a transformer that transforms an input AC voltage;
a frequency detector that detects, for each threshold in a plurality of thresholds in order from greatest to least, a frequency of the AC voltage based on an interval between time points at which the AC voltage via a band-pass filter exceeds the threshold;
a filter adjuster that calculates, when the frequency of the AC voltage detected by the frequency detector is greater than a predetermined value, a filter characteristic with the detected frequency of the AC voltage as a center frequency of the band-pass filter, and adjusts the band-pass filter based on the filter characteristic; and
a conversion unit that performs a control based on the AC voltage via the band-pass filter such that a power factor is equal to or greater than a predetermined value, and that converts the AC voltage transformed by the transformer into a DC voltage, and outputs the DC voltage.

2. The power conversion device according to claim 1, further comprising:
a voltage threshold outputter that changes the threshold to the next greatest threshold when a state in which the frequency of the AC voltage is undetectable by the frequency detector continues for a certain time period or longer.

3. A power conversion method executed by a power conversion device including a band-pass filter, the method comprising:
a voltage transformation step of transforming an input AC voltage;
a frequency detecting step of detecting, for each threshold in a plurality of thresholds in order from greatest to least, a frequency of the AC voltage based on an interval between time points at which the AC voltage via a band-pass filter exceeds the threshold;
a filter adjusting step of calculating, when the frequency of the AC voltage detected in the frequency detecting step is greater than a predetermined value, a filter characteristic with the detected frequency of the AC voltage as a center frequency of the band-pass filter, and of adjusting the band-pass filter based on the filter characteristic; and
a converting step of performing a control based on the AC voltage via the band-pass filter such that a power factor is equal to or greater than a predetermined value, converting the AC voltage transformed in the voltage transformation step into a DC voltage, and outputting the DC voltage.

4. The power conversion method according to claim 3, wherein:
in the frequency detecting step, the threshold is changed to the next greatest threshold when a state in which the frequency of the AC voltage is undetectable continues for a certain time period or longer.

* * * * *